May 17, 1960 C. E. MYERS 2,936,664
COMBINED CUTOFF AND SLITTING MACHINE
FOR UNCURED RUBBER STOCK MATERIAL
Filed Dec. 20, 1954 4 Sheets-Sheet 1
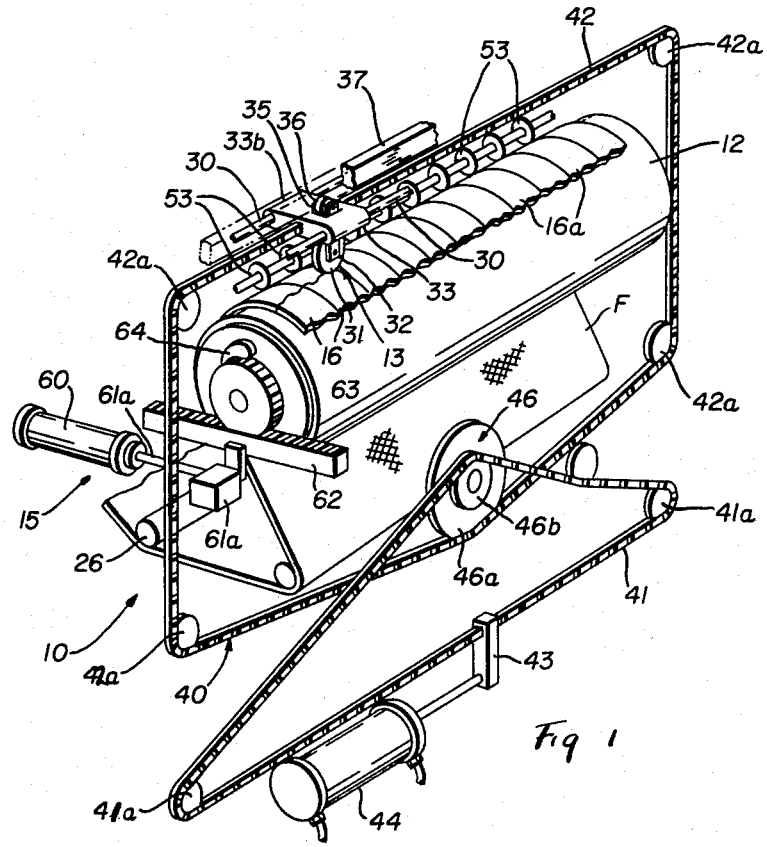
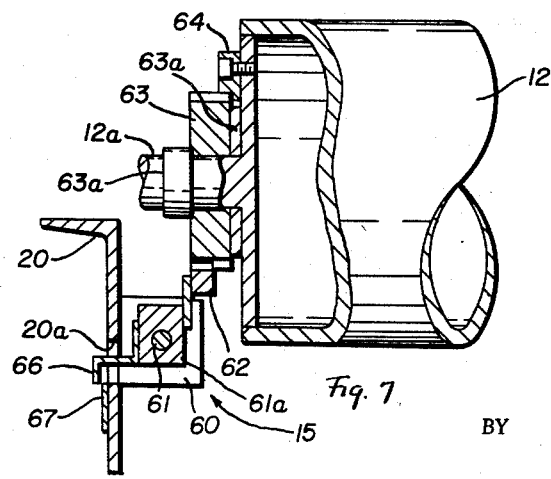
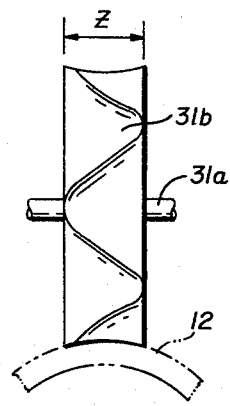
INVENTOR
CARL E. MEYERS
BY
ATTORNEY May 17, 1960

C. E. MYERS 2,936,664

COMBINED CUTOFF AND SLITTING MACHINE
FOR UNCURED RUBBER STOCK MATERIAL

Filed Dec. 20, 1954

INVENTOR.
CARL E. MYERS
BY
ATTORNEY

May 17, 1960

C. E. MYERS 2,936,664

COMBINED CUTOFF AND SLITTING MACHINE
FOR UNCURED RUBBER STOCK MATERIAL

Filed Dec. 20, 1954

INVENTOR.
CARL E. MYERS

BY

*J. William Freeman*

ATTORNEY

United States Patent Office 2,936,664
Patented May 17, 1960

2,936,664

COMBINED CUTOFF AND SLITTING MACHINE FOR UNCURED RUBBER STOCK MATERIAL

Carl E. Myers, Akron, Ohio, assignor to Akron Steel Fabricators Co., Akron, Ohio, a corporation of Ohio Application December 20, 1954, Serial No. 476,417

8 Claims. (Cl. 83—487)

This invention relates to combined cutoff and slitting machinery for uncured rubber stock material, and in particular, relates to combined cutoff and slitting mechanisms having particular utility in the handling and cutting of uncured rubber stock into pieces of predetermined width and length.

In the past, the handling of rubber fabric stock has always required special attention because of the inherently "tacky" nature of the same. As a result of this inherent quality, fabric stock is always transported during the handling thereof, between layers of non-adherent liner material so as to obviate the possibility of the uncured fabric stock coming in contact with other articles to which the same might possibly adhere upon contact. This adherent quality of uncured rubber fabric stock remains until such time as the same is vulcanized, at which time the handling of vulcanized articles may be carried on substantially in the same manner as other materials are normally handled.

To a certain extent, this previously described inherent disadvantage has rendered difficult the cutting of fabric stock material because of the mechanical difficulty of severing the fabric stock without simultaneously severing the ever present liner fabric. It has been discovered that for all practical purposes, the handling of large sheets of rubber stock material cannot be accomplished without the use of the liner material; and accordingly, the known prior art has not contemplated the provision of any commercially satisfactory type of fabric stock cutting equipment that is operable to longitudinally slit and transversely cut off fabric stock, so that a continuously advancing sheet of rather large area can be cut up into a plurality of individual pieces, all of which are of smaller area than the original sheet. Additionally, the construction and character of the known prior art has been further limited in that the same has not been capable of "measuring" lengths of fabric ply so as to permit the dispensing of successive pieces of equivalent lengths.

It has been long sought to the present time, to provide a machine capable of attaining the above results, especially in conjunction with the manufacture of certain replacement "patches" designed for use in repairing pneumatic tires. While the size of this "patch" material varies somewhat, a typical "patch" may have an area of approximately 4" x 6". Since present manufacturing procedures, with regard to the making of fabric stock, do not dictate as a practical matter, the manufacture of fabric stock material of such a narrow width, it accordingly becomes necessary to obtain such "patch" material from the larger sheets of fabric stock that are now manufactured; and accordingly, this larger stock material must be cut up into a plurality of smaller "patches" by transversely and longitudinally slitting the same to the proper dimensions.

To the present time, it has not been possible to produce this "patch" material on a production basis, and the known prior art at this time encompasses the manufacture of "patch" material by manual placement of a large sheet of fabric stock on a cutting table. The thus-placed fabric stock is then manually cut longitudinally and transversely thereof so as to produce a plurality of "patch" materials of relatively small area. These severed "patches" are then picked up by hand and disposed between liners and subsequently packaged for sale to the industry.

It has been recently proposed and found advantageous in the field of "patch" manufacturing to provide at least two edge portions of the individual "patch" with undulations, that cause a greater lineal length of edge portion to be provided whereby the effectiveness of the adherence of the edge portion of the "patch" to the particular area being treated is increased. Provision of this undulated or wavy edge portion has necessitated the exercise of greater care in the manual cutting of sheets of fabric stock placed on the cutting table; with the result that the overall period for this cutting operation is correspondingly increased. In addition to this time increase just described, further cost is involved with respect to the amount of human error that results from the aforementioned manual operations. This human error results in a corresponding increase in the number of rejected "patches" and thus causes an attendant increase in the overall price of the article involved.

It has been discovered that the above defects can be eliminated by the use of a hardened cutting drum that rotates to receive the advancing fabric stock on the external surface thereof. This applied stock may then be severed into small pieces, as a result of the coaction between the drum and a pair of cutting means, one of which operates longitudinally of the stock, while the other moves transversely thereof. The use of such a hardened cutting drum, together with the longitudinally and transversely operable cutting means, results in a highly efficient cutting operation that serves to produce a greater number of "patches" per hour of operation. Additionally, the produced "patch" materials are accurately cut so that the number of rejections on the same is held to a very low minimum.

It has been further found that the use of this cutting drum will additionally serve as a point of support for the severed pieces of "patch" materials, in view of the fact that these "patches" adhere to the surface of the cutting drum during the subsequent rotation thereof that follows the cutting means. These "patches" cling to the drum until the same revolves into an unloading zone, whereupon the same are automatically stripped from the drum and transferred to a loading platform for packaging.

Accordingly, it is one object of this invention to provide a combined slitting and cutoff machine that both longitudinally and transversely severs a relatively large sheet of fabric stock into a plurality of rectangular blocks, all of which are of smaller area than the original stock.

It is a further object of this invention to provide a machine of the nature above described that will be accurate and efficient in its operation.

It is a still further object of this invention to provide a combined slitting and cutoff machine that is operable to longitudinally and transversely sever a longitudinal sheet of fabric stock into predetermined rectangles of fabric stock, and being further characterized by the fact that the width or length of the rectangular blocks can be predetermined in advance of the operation.

It is a still further object of this invention to provide a combined slitting and cutoff machine capable of producing "patch" material having undulations on at least two edge portions thereof.

It is a still further object of this invention to provide a combined slitting and cutoff machine for uncured rubber stock wherein the stock may be severed longitudinally and transversely thereof without effectuating a corresponding cutting of the separating liner employed during handling of said stock.

It is a still further object of this invention to provide a combined slitting and cutoff machine of the character described that is fed longitudinal sheets of fabric stock at one end thereof and delivers accurately cut "patch" strips of predetermined width and length at the opposed end thereof.

It is a still further object of this invention to provide a fabric machine that will simultaneously measure and cut off fabric stock into predetermined lengths.

These and other objects of the invention will become more apparent upon a reading of the following brief specification considered and interpreted in the light of the accompanying drawings.

Of the drawings:

Figure 1 is a schematic layout drawing illustrating the arrangement of the component parts of the cutting machine.

Figure 3:
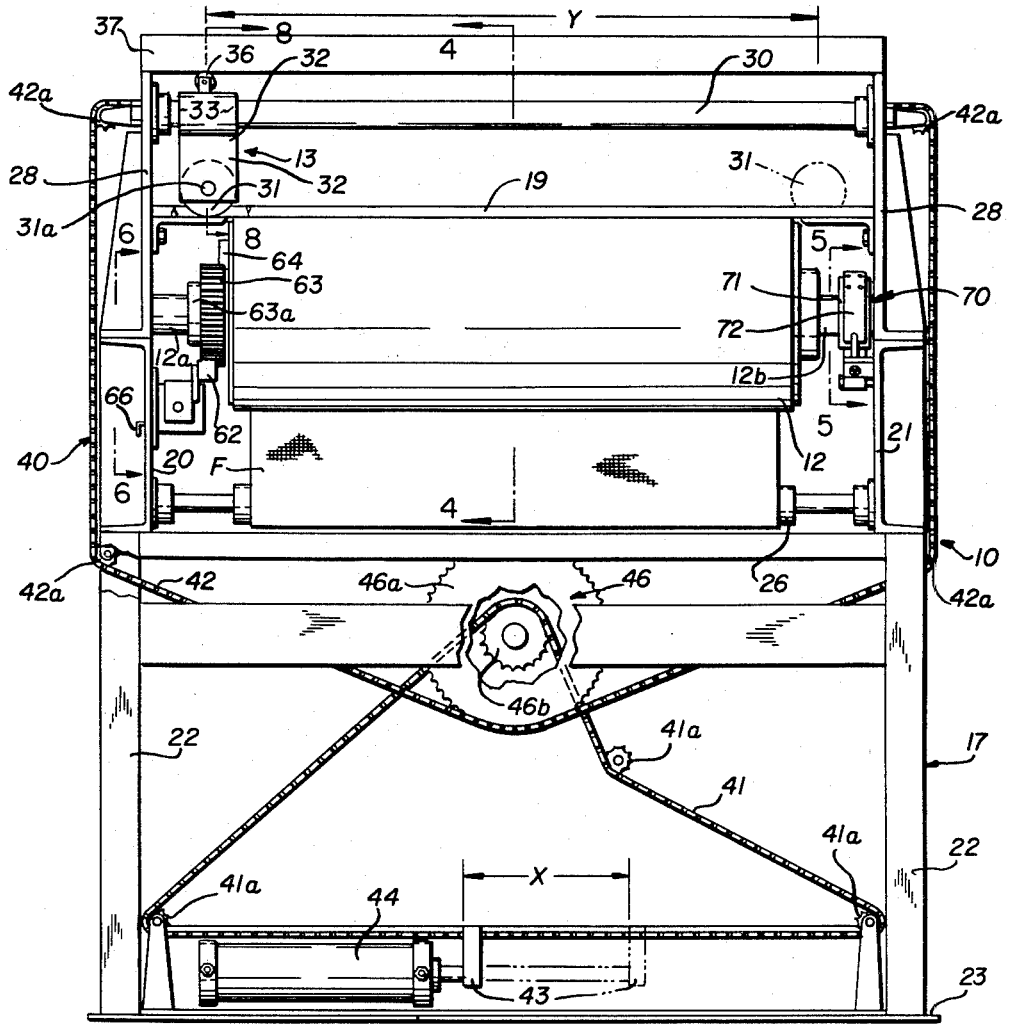
Figure 3 is a view taken on the lines 3—3 of Figure 2.
Figure 5:
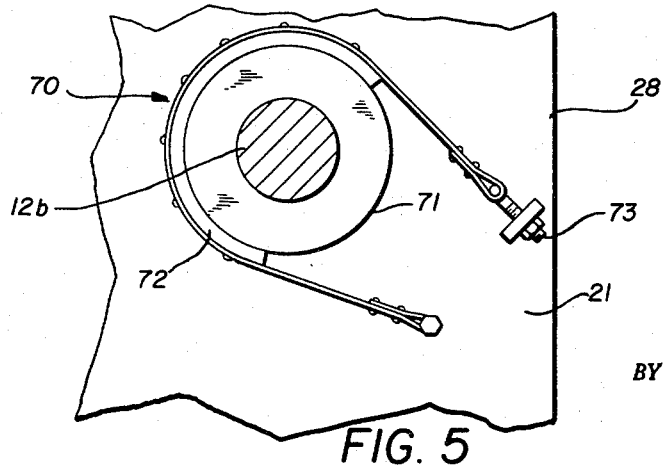
Figure 6:
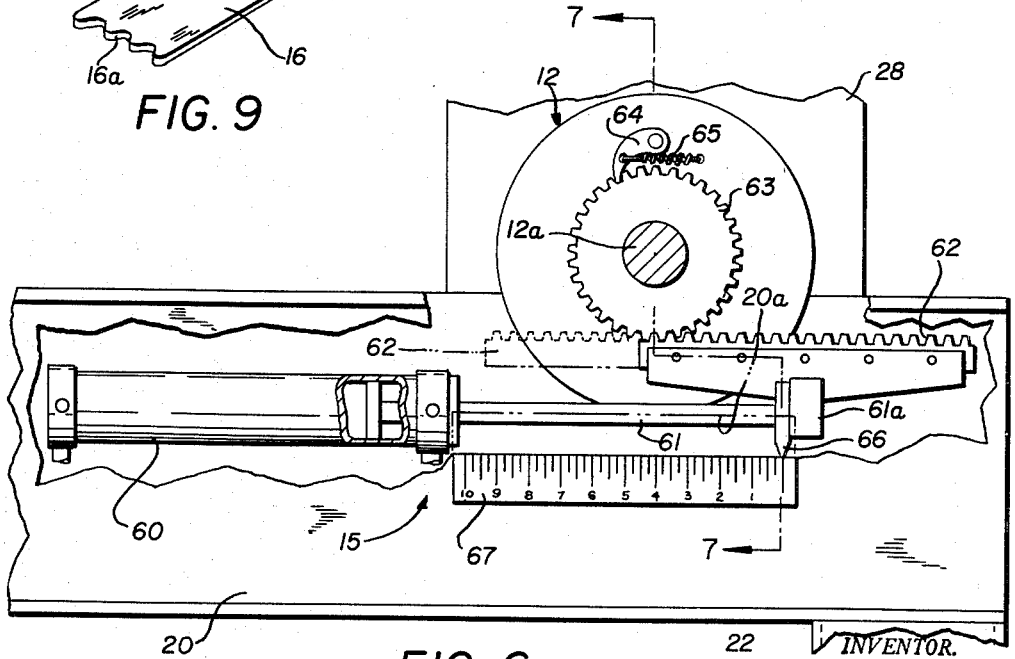

Figures 5 and 6 are views taken on the lines 5—5 and 6—6, respectively, of Figure 3.

Figure 7 is a sectional elevation illustrating in detail the mounting of the drum cylinder of the machine.

Figure 8:
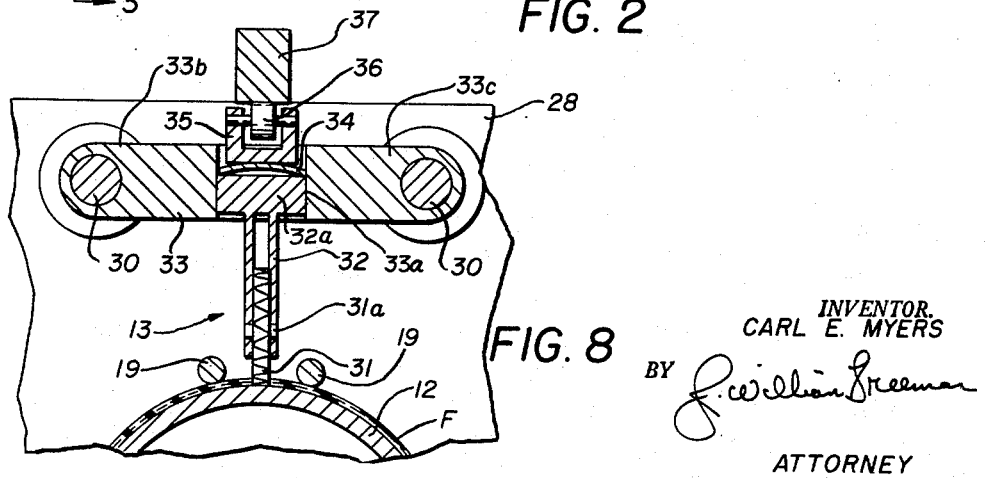

Figure 8 is a view taken on the lines 8—8 of Figure 3.

Figure 9:
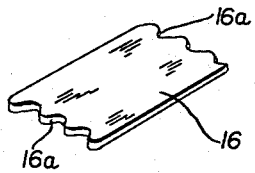

Figure 9 is a perspective view of a piece of "patch" material produced by the machine of this invention.

Figure 10 is an elevation of the cutting disc employed.

Figure 2:
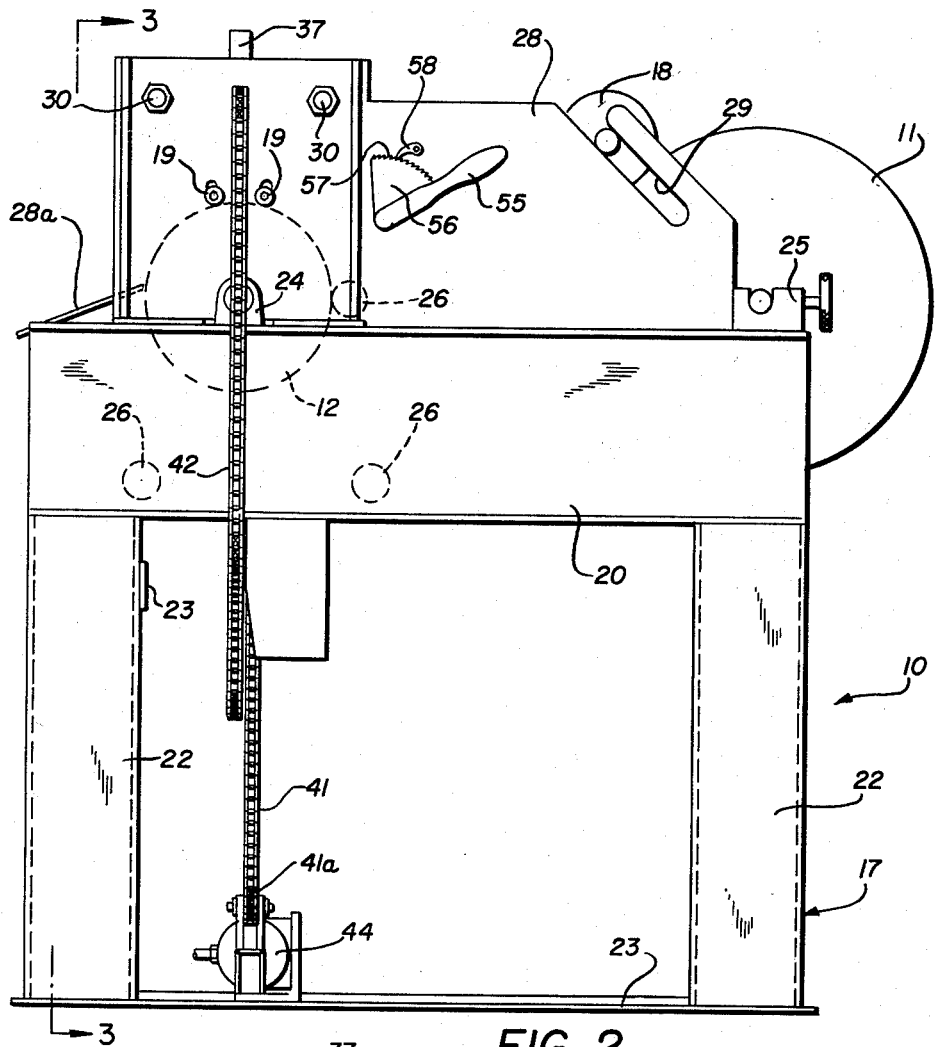
Figure 2 is a side elevation of the machine.

Referring now to the drawings, and in particular, to Figures 1, 2 and 3 thereof, the improved cutting machine, generally designated as 10, is shown operating to withdraw fabric stock F from a fabric roll 11 for application over the external surface of a transfer drum 12. This applied fabric F, while positioned on the drum 12, is subjected to the action of transversely movable cutting means 13 and longitudinally operable cutting means 14 that operate, upon rotation of the drum 12 by actuating means 15, to cut the fabric stock F into small rectangular segments 16, 16; all of the aforementioned component elements being supported with respect to each other by a common frame generally designated as 17.

Figure 4:
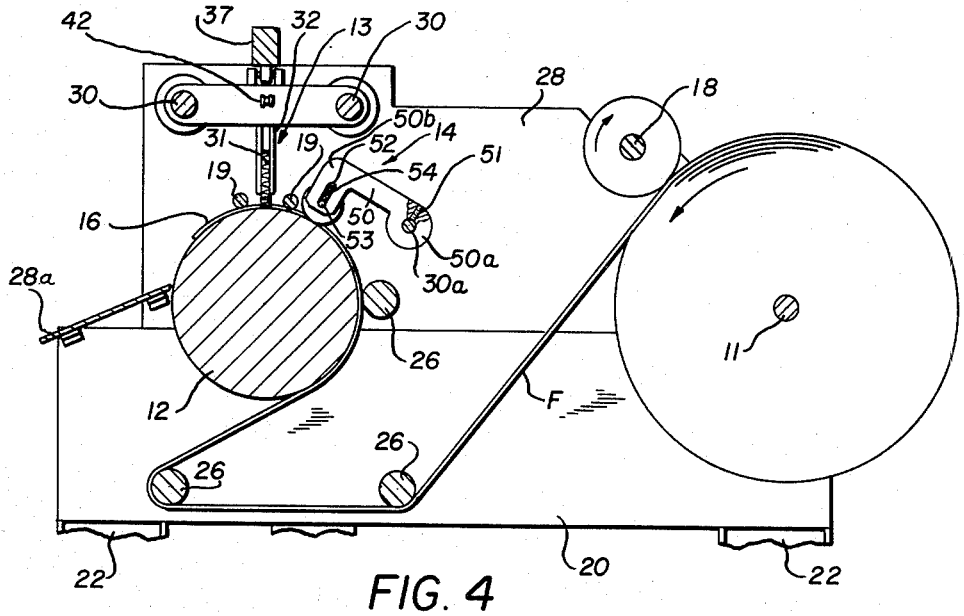
Figure 4 is a sectional view taken on the lines 4—4 of Figure 3.

This frame 17, is illustrated in Figures 2 and 3 of the drawings as including a pair of spaced support beams 20 and 21 that are maintained in a position of elevated support by upright corner frames 22, 22 which are in turn, interconnected by tie members 23, 23 so as to provide a rigid framework that will function to support the component elements of the machine 10. To this end, the opposed axial ends of the drum 12 and the fabric roll 11 are shown supported through bearing blocks 24, 24 and 25, 25, respectively, on the beams 20 and 21; while idler rolls 26, 26 are similarly supported at the axial ends to guide the fabric stock F in its period of movement from the stock roll 11 to the external surface of the drum (see Figure 4).

For the purpose of supporting the cutting means 13 and 14, as well as a liner roll 18, each beam 20 and 21 includes an upright support extension that is generally designated as 28; the arrangement being such that guide rods 30, 30 and a guide rod 30a can be journalled at their opposed axial ends, in the extensions 28, 28 to respectively support the cutting means 13 and 14. Additionally, each extension 28 includes an inclined slot 29 that receives the axial ends of the liner roll 18, while idler rolls 19, 19 are similarly journalled to the support extensions 28, 28 so as to be in close proximity with the external surface of the drum 12 to thus effectuate "holding down" of fabric stock F on drum 12, as the same is severed by the cutting means 13 in a manner to be described. When the fabric F has been severed into pieces 16, 16 on the drum 12, as will be described, the same (pieces 16, 16) are shown as being received on an unloading platform 28a that extends between the plates 28, 28 so as to have an edge portion thereof disposed adjacent the drum 12, so as to strip the pieces 16, 16 from the surface of the rotating drum 12.

As previously indicated, the cutting means 13 are operable transversely of the drum 12; and accordingly, the same are illustrated as including a circular cutting disc 31 that is rotatably journalled on pins 31a, 31a, in a guide frame 32, that is in turn slidably received in the aperture 33a of a guide block 33; the arrangement being such that the ends 33b, 33c of block 33 are received on the rods 30, 30, while the head 32a of guide frame 32 contacts an arched spring 34. This spring 34 is also acted upon by a shiftable U-block 35 that carries a roller 36 for contact with a pressure bar 37, that extends between plates 28, 28. In this manner, a high cutting pressure can be exerted by the disc 31, in view of the pressure buildup effectuated by bar 37, roller 36, spring 34 and guide frame 32 (see Figure 8). As a result of the foregoing structure, the cutting disc 31, the guide frame 32, the guide block 33 and roller 36 all move as a unit transversely of the drum 12, upon the energization of a sprocket chain mechanism that is generally designated as 40, with placement of head 32a in aperture 33a, serving to cause frame 32 and block 33 to move in unison.

This sprocket mechanism 40 is best illustrated in Figures 1, 2 and 3 of the drawings and in essence, includes a sprocket chain 41, a sprocket chain 42, a link arm 43 interconnecting the sprocket 41, with a piston 44, with chain 42 being connected to frame 33.

The detailed structure of the mechanism 40 is such that both the chains 41 and 42 move through closed cyclic paths that coincide about a common axis of rotation defined by the sprocket gear 46. This sprocket 46 includes two sets of sprocket teeth 46a and 46b that respectively mesh with the chains 42 and 41. The remainder of the closed cyclic path of the chain 41 is defined by idler sprockets 41a, 41a while chain 42 is played about idler sprockets 42a, 42a (see Figure 2). As a result of the varying diameters of the sprocket teeth 46a, and 46b, the action of the sprocket chain mechanism 40 is such that expansion of the piston 44 will result in the link 43 moving through the relatively short transverse distance designated as "X," while the cutting disc 31 will reciprocate over the entire transverse surface of the drum 12 as defined by the dimension Y.

Referring now to the cutting means 14, it has been previously indicated that the same are rotatable about the axis of the rod 30a so as to effectuate a longitudinal slitting of the advancing fabric stock F that is applied over the surface of the drum 12. Accordingly, in Figure 4 of the drawings, the rod 30a is shown as carrying one or more link arms 50 that are nonrotatably secured to the rod 30a at one end 50a thereof, by set screws 51, 51, for example. The other end 50b of the link arm 50 includes a slot 52 within which is received the hubs of a cutting disc 53; the arrangement being such that a spring 54 operates to urge the disc 53 away from the link arm 50 to the position of Figure 4, which may be considered as a point of minimum pressure contact between the disc 53 and the drum 12.

To the end of increasing this degree of pressure contact between the disc 53 and the drum 12, one axial end of the rod 30a is provided with a handle 55 that includes an arcuate segment 56 defined on its peripheral edge portion by a ratchet rack 57 that is engaged by a pawl 58 pivotally secured to the plate 28. In this manner, movement of the handle 55 in a counter-clockwise direction (see Figure 2) will result in equivalent counter-clockwise of the link end 50b so as to result in compression of the spring 54, to thus create an increased amount of contact pressure between the discs 53, 53 and the drum 12. In actual practice, several cutting discs 53, 53 are employed so that the fabric stock may be slit into a plurality of narrow strips. The use of the set screws 51, 51, for example, renders possible the variation of the transverse location of each disc 53; and accordingly, the same (discs 53) may be positioned as desired in order to obtain the requisite width of cut.

The attainment of the improved cutting operation of the machine has been previously indicated as being predicated upon the coaction of the cutting means 13 and 14 with the drum 12, upon rotation thereof by the actuating means 15.

Accordingly, in Figures 6 and 7, the actuating means 15 are shown as including a piston 60 secured to the beam 20, and having an extensible piston rod 61 that carries on the free end 61a thereof, a gear rack 62. This gear rack 62 is shown as meshing with a pinion 63 that is in turn rotatably mounted on the axle 12a of the drum 12; the usual thrust collars 63a, 63a being provided to obviate axial movement of the pinion 63 on axle 12a. Also engageable with the pinion 63 is a pivoted pawl member 64 that is carried by the drum 12 and urged into contact with the teeth of the pinion 63 by a spring 65. In this manner, the rack 62 can move from the chain-dotted position of Figure 6 to the full line position thereof, without rotating the drum 12, in view of the fact that the counter-clockwise rotation of the pinion 63 during this just-mentioned movement of the pinion 63 will pivot the pawl 64 out of engagement as each tooth in the pinion 63 is contacted. However, when the rack 62 is moved from the full line position of Figure 6 to the chain dotted line position thereof, the pawl 64 cannot be pivoted, and accordingly, the clockwise rotation of the pinion 63 that results from the movement of the rack 62, will result in a similar clockwise rotation of the drum 12. This rotation will continue until such time as the axial movement of the piston rod 61 is stopped, at which time the rotation of the drum 12 may similarly be stopped by brake means 70 in a manner to be described.

For the purpose of controlling the rotation of the drum 12 so that the same rotates through an arcuate path of predetermined length so as to measure off a predetermined length of fabric between successive operations of the cutting means 13, the rack 62 includes a pointer arm 66 that extends outwardly through a slot 20a of the beam 20 so as to be aligned with an indicator scale 67 that is provided on the exterior face of the beam 20. In this fashion, the stroke of the piston rod 61 can be varied by adjusting the piston 60 in known manner; and thus the length of the fabric stock F that will be advanced with respect to the cutter disc 31 during one period of rotational movement of the drum 12, can be accurately adjusted to permit predetermination of the longitudinal length of the pieces 16, 16.

As previously indicated, it is desirable to immediately stop the rotation of the drum 12 upon discontinuance of the axial movement of the piston rod 61; and accordingly, there is illustrated in Figure 5, a braking apparatus that has been designated as 70. This braking apparatus 70 is of simplified construction, wherein a brake drum 71 is shown secured around an axle 12b of the drum 12, so as to be frictionally engaged by a surrounding brake band 72 that has the ends thereof secured to beam 21, with frictional adjustment being provided by the screw 73. This structure results in the creation of a drag force that will obviate any rotational movement of the drum 12, except when the same is being driven by the action of the gear rack 62 on the pinion 63 as previously described.

In the preceding paragraphs, general reference has been with respect to description of the drum 12 and the cutting discs 31 and 53. It is a preferred embodiment of this invention that the construction of the drum 12 be such that the external surface thereof is hardened to thus permit the same to serve as a cutting surface for the relatively softer discs 31 and 53.

Similarly, while the cutting disc 53 is of known construction, the cutter disc 31 is shown in Figure 10 of the drawings as having a concave axial width Z at the peripheral edge portion thereof for complemental engagement with drum 12. To the further end of attaining undulated edge portions on the pieces 16, 16 as shown in Figure 8, the actual cutting edge 31b of the cutting disc 31 is shown as being provided in an undulated path between the opposed axial edges of this disc 31. In this manner, movement of the cutting disc 31 transversely of fabric stock F that has been applied on the drum 12 as previously described, will result in the fabric being severed so as to have an undulated or wavy edge portions 16a, 16a provided thereon (see Figure 10). It is manifest however, in this regard, that a conventional cutting disc could be substituted for the cutting disc 31 set forth in connection with this invention.

*Operation of the machine*

In use of operation of the machine 10, the same is first provided with a roll 11 of fabric stock F that is journalled at its axial ends in the blocks 25, 25, so as to permit fabric stock F to be withdrawn over the idler rolls 26, 26 for ultimate placement on the external surface of the drum 12. During this period of withdrawal of the fabric stock F from roll 11, the separating liner will be automatically wound up on the roll 18 as a result of the frictional contact between the materials that are respectively carried on rolls 11 and 18. This frictional contact will be maintained throughout the operation, in view of the provision of the inclined slot 29 that permits axial shifting of the roll 18 to permit the continued frictional contact required to effectuate this automatic windup of the liner L.

With the fabric stock F thus applied to the drum 12, the piston 60 may be actuated a few times to cause rotation of the drum 12, and thus apply a greater amount of fabric stock F to the surface of the drum 12, the fabric F being held on the drum surface as a result of the tacky nature of the same. As this rotation continues the fabric F will be advanced into contact with the cutting discs 53, 53 and further rotation of the drum 12 will cause these cutting discs 53, 53 to sever the fabric F into longitudinal strips. After the free edges of these strips have advanced past the cutting plane defined by the cutting means 13, the rotational movement of the drum may be stopped, and the machine 10 is now ready for operation.

At this point, the cutting means 13 may be brought into action by actuating the piston 44 so that link 43 will move through distance X so as to simultaneously, through chains 41 and 42, move the cutting disc 31 through distance Y (see Figure 3).

This transverse movement of the disc 31 will operate to cut off the longitudinal fabric strips so as to provide the same with an undulated edge 16a, 16a as shown in Figure 9.

With the fabric F severed on one longitudinal edge as just described, the cutting disc 31 and the link 43 may be returned to their full line positions of Figure 3 by operating the piston 44 in the reverse direction; and after such return the drum actuating means 15 may be operated to rotate the drum 12 through a predetermined degree of arcuate rotation, with the piston 60 first being expanded to the full line position of Figure 6. Upon contraction of the piston 60 towards the chain-dotted line position, the rack 62 will drive the pinion 63 in a clockwise direction that in turn results, through pawl 64, in a similar clockwise rotation of drum 12. This clockwise rotation of the drum 12 will continue until the rack 62 reaches the chain-dotted position of Figure 6; at which time the direction of movement thereof will be reversed so as to move the same towards the full line position. During this last-mentioned movement, the drum 12 will be freed of the driving engagement created by the pawl 64 and accordingly, the free clockwise rotation thereof will be stopped by the friction drag provided by the braking means 70, with the result that the drum 12 will have the rotational movement thereof stopped upon cessation of the movement to the left of the rack 62 in Figure 6.

During this just-described period of controlled rotation of the drum 12, the cutting discs 53, 53 are continuously rolling so as to effectuate longitudinal slitting of the advancing fabric F; it being understood that the amount of contact pressure between these discs 53, 53 and the drum 12 can be increased or decreased as desired by movement of the handle 55 (see Figure 2). Similarly, it is to be understood that the cutting discs 53, 53 could be replaced by modified cutter discs that include an undulated edge portion, to thus result in the production of pieces 16, 16 having undulations on all four edges.

When the drum 12 has been stopped by the braking means 70 as previously indicated, the cutting means 13 may once again be operated to move the disc 31 transversely of the drum 12 and thus effectuate another cutoff of the fabric strips F which will now become pieces 16, 16. At this point, repetition of the above cycle of operation will result in the production of additional pieces 16, 16 of the same length and width which may be predetermined in advance of the operation. This predetermination of the size of the pieces 16, 16 is accomplished by the transverse placement of the discs 53, 53 on rod 30a, as well as the adjustment of piston 60 to control the length of the stroke of the piston rod 61; and it is to be understood that such adjustments can be made without the exercise of invention. It will also be noted that the cutting pressure of the disc 31 will be maintained during the transverse movement of the drum 12, as a result of the spring loaded contact between roller 36 and pressure bar 37; the latter serving to obviate deflection that would otherwise result in loss of cutting pressure.

In the preceding paragraphs, no specific means have been designated for initiating the alternate reciprocatory movement of the pistons 44 and 60. While this required movement could be easily accomplished by the use of known type prior art hand controls, this invention additionally contemplates the use of automatic reversing mechanisms for this purpose. Thus, it is to be understood that the piston 44, for example, could be actuated by a solenoid switch (not shown) that was positioned on the plate 28 so as to be contacted by the transversely moving cutting disc 31 to thus cause the piston 44 to be operated in the reverse direction and thus cause the return of disc 31 to the full line position of Figure 3.

Similarly, the piston 60 could be equipped with an adjustable solenoid (not shown), that would be contacted by the rack 62 for example, to initiate reversed movement of piston rod 61. It is also contemplated that reciprocatory movement of these pistons 44 and 60 could be timed so that the same would alternately operate to provide a completely automatic cutting machine 10.

In the preceding paragraphs, there has been illustrated a combined cutoff and slitting machine 10, that is operable to efficiently measure off pieces 16, 16 out of a sheet of fabric stock F. It has also been shown how the length and width of these pieces can be varied and predetermined in advance of operation of the machine 10, so that the machine measures off specific lengths between successive operations. It has been further shown how the machine 10 includes simplified windup means for handling the separating liner L that is unwound from the stock roll 11; and also how the machine includes a receiving tray 28a that receives the dispensed pieces 16, 16.

It has been previously indicated how the discs 31 and 53 may be replaced with modified types of cutting discs without affecting the operation of the machine 10, and it has also been shown how the certain component elements of the machine 10 could be equipped with solenoid switches to render the operation thereof, partially or completely automatic, as required.

It follows that other equivalent substitutions could be employed by following the teachings of the invention, and accordingly, modifications of the invention may be resorted to without departing from the spirit thereof or the scope of the appended claims.

What is claimed is:
1. A cutting machine of the character described, comprising: a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely of said drum and being secured at its opposed axial ends to said spaced supports; a mounting head, movable transversely of said guide frame; a second cutter disc, rotatably carried by said mounting head in urged-apart relationship therewith; and means for intermittently moving said mounting head transversely of said guide frame, whereby the peripheral edge portion of said second cutting disc is rolled transversely of said drum in tensional contact therewith; the axis of rotation of said first and second cutter discs being normal to each other, whereby material received on said drum will be cut longitudinally and transversely by said first and second discs upon movement thereof across the external surface of said cutting drum.

2. A cutting machine of the character described, comprising: a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely of said drum and being secured at its opposed axial ends to said spaced supports; a mounting head, movable transversely of said guide frame; a second cutter disc, rotatably carried by said mounting head in urged-apart relationship therewith; means for intermittently moving said mounting head transversely of said guide frame, whereby the peripheral edge portion of said second cutting disc is rolled transversely of said drum in tensional contact therewith; and means for repetitively advancing said drum through successive rotational advances of equivalent arcuate lengths, whereby said means for moving said cutter disc may be operated between said successive rotational advances of said transfer drum; the axis of rotation of said first and second cutter discs being normal to each other, whereby material received on said drum will be cut longitudinally and transversely by said first and second discs upon movement thereof across the external surface of said cutting drum.

3. A cutting machine of the character described, comprising: a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely of said drum and being secured at its opposed axial ends to said spaced supports; a mounting head, movable transversely of said guide frame; a second cutter disc, rotatably carried by said mounting head in urged-apart relationship therewith; means for intermittently moving said mounting head transversely of said guide frame, whereby the peripheral edge portion of said second cutting disc is rolled transversely of said drum in tensional contact therewith; and means for repetitively advancing said drum through successive rotational advances of equivalent arcuate lengths, said last mentioned means including a rack and pinion connection between said drum and at least one said support; the axis of rotation of said first and second cutter discs being normal to each other, whereby material received on said drum will be cut longitudinally and transversely by said first and second discs upon movement thereof across the external surface of said cutting drum.

4. A cutting machine of the character described, comprising; a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely of said drum and being secured at its opposed axial ends to said spaced supports; a mounting head, movable transversely of said guide frame; a second cutter disc, rotatably carried by said mounting head in urged-apart relationship therewith; means for intermittently moving said mounting head transversely of said guide frame, whereby the peripheral edge portion of said second cutting disc is moved transversely of said drum in rolling contact therewith; and means for repetitively advancing said drum through successive rotational advances of equivalent arcuate lengths, said last-mentioned means including a rack member longitudinally shiftable with respect to one said support and being meshed with a drive pinion provided on the axis of said drum; the axis of rotation of said first and second cutter discs being normal to each other, whereby material received on said drum will be cut longitudinally and transversely by said first and second discs upon movement thereof across the external surface of said cutting drum.

5. A cutting machine of the character described, comprising; a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely above said drum and being carried by said spaced supports; a mounting head movable transversely of said frame; a second cutter disc, rotatably carried by said mounting head and having the peripheral edge portion thereof normally maintained in tensional contact with the external surface of said drum; and means for intermittently moving said mounting head transversely of said guide frame, whereby the peripheral edge portion of said second cutting disc is moved transversely of said drum in rolling contact therewith; said means including a plurality of pulley members; a cable arranged in a closed cyclic path around said pulleys; a link interconnecting said disc and said cable; a second link interconnecting said piston and said cable, whereby reciprocatory movement of said piston will result in movement of said cable around said pulley members to cause equivalent reciprocatory movement of said disc across said drum; the axis of rotation of said first and second cutter discs being normal to each other, whereby material received on said drum will be cut longitudinally and transversely by said first and second discs upon movement thereof across the external surface of said cutting drum.

6. A cutting machine of the character described, comprising; a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely above said drum and being carried by said spaced supports; a mounting head movable transversely of said frame; a second cutter disc, rotatably carried by said mounting head and having the peripheral edge portion thereof normally maintained in tensional contact with the external surface of said drum; and means for intermittently moving said mounting head transversely of said guide frame, whereby the peripheral edge of said second cutting disc thereof is moved transversely of said drum in rolling contact therewith; said means including a set of pulleys; a cable, arranged in a closed cyclic path around said pulleys; a link member interconnecting said cable and said piston, whereby reciprocatory movement of said piston will result in linear movement of said link; a second set of pulleys; a second cable arranged in a closed cyclic path around said pulleys; a second link member interconnecting said second cable with said cutting disc; at least one pulley of each said set being of different diameter and being rotated about a common axis, whereby said disc will travel a greater lineal length in reciprocating than will said link secured to said piston; the axis of rotation of said first and second cutter discs being normal to each other, whereby material received on said drum will be cut longitudinally and transversely by said first and second discs upon movement thereof across the external surface of said cutting drum.

7. A cutting machine of the character described, comprising; a frame including spaced vertical supports; a cylindrical transfer drum having the opposed axial ends thereof rotatably carried by said supports; at least one cutting disc supported about its axis between said supports and having the peripheral edge portion thereof normally maintained in tensional contact with the external surface of said drum; a guide frame extending transversely above said drum and being carried by said spaced supports; a mounting head movable transversely of said frame; a second cutter disc, rotatably carried by said mounting head and having the peripheral edge portion thereof normally maintained in tensional contact with the external surface of said drum; means for intermittently moving said mounting head transversely of said guide frame, whereby the peripheral edge portion of said second cutting disc is moved transversely of said drum in rolling contact therewith; and means for repetitively advancing said drum through successive rotational advances of equivalent arcuate lengths; said means for moving said cutting disc transversely of said guide frame including a plurality of pulley members; a cable arranged in a closed cyclic path around said pulleys; a link interconnecting said disc and said cable; a second link interconnecting said piston and said cable, whereby reciprocatory movement of said piston will result in movement of said cable around said pulley to cause equivalent reciprocatory movement of said disc across said drum; said last-mentioned means for repetitively advancing said drum including a rack member longitudinally shiftable with respect to one said support and being meshed with a drive pinion provided on the axis of said drum; the axis of rotation of said first and second cutter discs being normal to each other, whereby material received on said drum will be cut longitudinally and transversely by said first and second discs upon movement thereof across the external surface of said cutting drum.

8. The device of claim 1 further characterized by the fact that the tensional contact between said first mentioned cutting disc and said drum may be varied.

References Cited in the file of this patent
UNITED STATES PATENTS

| | | |
|---|---|---|
| Re. 16,702 | Johnstone | Aug. 6, 1927 |
| 65,173 | Chubbuck | May 28, 1867 |
| 527,051 | Cramby | Oct. 9, 1894 |
| 851,213 | Ballard | Apr. 23, 1907 |
| 1,118,460 | Winkley | Nov. 24, 1914 |
| 1,249,550 | Straubel | Dec. 11, 1917 |
| 1,421,969 | Loeb | July 4, 1922 |
| 1,448,723 | Brundage | Mar. 20, 1923 |
| 1,758,838 | Jarvis | May 13, 1930 |
| 1,866,799 | Clark | July 12, 1932 |
| 2,035,946 | Cummings | Mar. 31, 1936 |
| 2,229,487 | Barber | Jan. 21, 1941 |
| 2,527,739 | Knabusch et al. | Oct. 31, 1950 |
| 2,595,060 | Dixon et al. | Apr. 29, 1952 |
| 2,693,236 | Kuts | Nov. 20, 1954 |